United States Patent
Ikado et al.

(10) Patent No.: US 6,313,943 B1
(45) Date of Patent: Nov. 6, 2001

(54) UNDERWATER MICROSCOPE

(75) Inventors: Kazuyoshi Ikado; Keiichi Morinaga; Katsuya Nishi, all of Otsu (JP)

(73) Assignee: Kistem Co., Ltd., Shiga (JP)

( * ) Notice: Subject to any disclaimer, the term of this patent is extended or adjusted under 35 U.S.C. 154(b) by 0 days.

(21) Appl. No.: 09/451,015

(22) Filed: Nov. 29, 1999

(51) Int. Cl.$^7$ .............................. G02B 21/00; G01N 21/01
(52) U.S. Cl. .......................... 359/368; 359/363; 359/385; 359/398
(58) Field of Search .......................... 359/368, 362–363, 359/391–398, 503; 348/79–82

(56) References Cited

U.S. PATENT DOCUMENTS 2,232,354 * 2/1941 Weygand .............................. 359/395

FOREIGN PATENT DOCUMENTS

| 2210442 | * | 9/1973 | (DE) | 359/395 |
| 4-137315 | | 12/1992 | (JP) . | |
| 5-249381 | * | 9/1993 | (JP) | 359/503 |
| 9-61360 | | 3/1997 | (JP) . | |
| 641250 | * | 1/1979 | (RU) | 359/395 |

* cited by examiner

*Primary Examiner*—Thong Nguyen
(74) *Attorney, Agent, or Firm*—Milde, Hoffberg & Macklin, LLP

(57) ABSTRACT

In order to provide an underwater microscope which can obtain a sharp picture of live underwater microorganisms in motion, an underwater microscope 10 comprises at least a camera 12 having an optical axis of an optical system, a channel 22 introducing a water sample, a sample chamber 16 having a thickness ranging from 0.5 mm or more to 2 mm or less placed near a focus of the camera 12 and connected to the channel 22, and a light source 18 placed diagonally behind the sample chamber 16, wherein the light source 18 provides dark field illumination to the microscope 10 and the sample chamber 16 is in a rectangle shape in the horizontal cross-section, a pump 20 which is capable of forward feeding, back feeding, and stopping feeding for introducing the water sample into the sample chamber 16 is equipped, and an XY mobile device 14 is placed to move a focus position of the camera 12, or an underwater microscope 11 is characterized in that an LED light source 74 is arranged in a circle around the optical axis of the optical system of the camera 12 and the LED light source 74 emits light intermittently in synchronism with a video signal of the camera 12.

13 Claims, 14 Drawing Sheets

UNDERWATER MICROSCOPE

BACKGROUND OF THE INVENTION

1. Field of the Invention

The present invention relates to a microscope for observing microorganisms in water. More particularly, the present invention relates to an underwater microscope which can obtain a sharp picture of live underwater microorganisms in motion.

2. Description of Related Art

When researchers wanted to examine underwater microorganisms such as plankton or the like, conventionally, they drew up a water sample on board and carried it to a microscope prepared on board or on the ground and then dropped it on a preparation with sandwiched by cover glasses to observe the underwater microorganisms with an ordinary optical microscope. Especially, when many samples were needed, such as when there were many places to be researched or when a research was required per submerged depth of water, it took not only time and effort in picking up water samples, but also there was a problem with difficulties in securing a place for storing the water samples, or the like. Since underwater microorganisms had been dead by the time when they were observed after being sampled, it was very difficult to observe live underwater microorganisms in motion.

To solve this problem, a submersible microscope, with which researchers can directly observe underwater microorganisms, has been provided (Japanese Patent Application No.3-43916). That is, a camera and a luminous part are equipped within a watertight case, and a channel connecting to inside and outside the watertight case is placed near a focus of the camera. According to the underwater microscope in the present invention, direct observations of microorganisms in water, which eliminate the need for water samples, allow effects such as the prevention of deterioration with time, etc. to be confirmed. However, the following problems have been newly raised. One is that the picture becomes poor in sharpness due to the shake of the underwater microscope caused by ocean waves or the like. The other is that when studying the difference of microorganisms by the depth of water, latency becomes longer because of late interchange of water samples within the channel, which requires a long time for research.

In order to solve these problems, inventors of the present invention previously provided a submersible microscope, which quickly interchanged a water sample by connecting a pump to a channel and decreased the shake of the water sample within the channel by disposing a drain valve (Japanese Patent Application No.7-213314). In the underwater microscope of the present invention, there were still some problems left, regardless of the nearly sure attainment of its serviceable level by confirming prominent effects such as the speedy interchange of the water sample within the channel and the sharp decrease in the shake of the water sample, or the like.

More specifically, when we try to observe live underwater microorganisms in motion as we can see in natural environments, we have to relatively widen and thicken a sample chamber located near a focus of an underwater microscope. However, the following problems have been raised:

1) Brightened whole image is caused by refraction of light due to the water sample, which leads to a lower contrast.

2) A shake of the underwater microscope is caused by a large motion of the water sample within the sample chamber, which leads to a poor sharpness of the picture.

3) Underwater microorganisms in brisk motion may go out of the field of view.

4) It is difficult to observe underwater microorganisms in brisk motion while focusing.

For a method for observing live underwater microorganisms in motion, it is also possible to observe a picture transmitted from a camera on the boat with a microscope placed underwater while being towed by a boat. In this method, it was very difficult to obtain a sharp picture which clearly captured underwater microorganisms because the underwater microscope was terribly shaken by the movement of the boat and researchers observed them under a condition that there was a fairly swift flow of water near a focus of the microscope.

SUMMARY OF THE INVENTION

As a result of intensive studies in view of the above mentioned various prior arts to provide an underwater microscope which can capture live underwater microorganisms in motion with a sharp picture, the inventors of the present invention have attained the present invention.

It is one important object of the present invention to provide an underwater microscope which comprises at least a camera having an optical axis of an optical system, a channel for introducing a water sample, a sample chamber having a thickness ranging from 0.5 mm or more to 2 mm or less placed near a focus of the camera and connected to the channel, and light sources placed diagonally behind the sample chamber, wherein the light sources provide dark field illumination to the microscope.

It is another object of the underwater microscope in the present invention to provide an underwater microscope which comprises at least a camera having an optical axis of an optical system, a channel for introducing a water sample, a sample chamber having a thickness ranging from 0.5 mm or more to 2 mm or less placed near a focus of the camera and connected to the channel, and light sources placed diagonally behind the sample chamber, wherein the sample chamber has an inlet and an outlet, and the picture surface of the sample chamber is in a rectangular shape.

It is still another object of the present invention to provide an underwater microscope which comprises at least a camera having an optical axis of an optical system, a channel for introducing a water sample, a sample chamber having a thickness ranging from 0.5 mm or more to 2 mm or less placed near a focus of the camera and connected to the channel, and light sources placed diagonally behind the sample chamber, wherein a pump connected to the channel and capable of forward feeding, back feeding, and stopping feeding a water sample into the sample chamber, is equipped, and the sample chamber has an inlet and outlet.

It is a further object of the present invention to provide an underwater microscope equipped with an XY mobile device to move a focus position of the camera which comprises at least a camera having an optical axis of an optical system, a channel for introducing a water sample, a sample chamber having a thickness ranging from 0.5 mm or more to 2 mm or less placed near a focus of the camera and connected to the channel, and light sources placed diagonally behind the sample chamber.

It is a still further object of the present invention to provide an underwater microscope which comprises at least a camera having an optical axis of an optical system, a channel for introducing a water sample, a sample chamber having a thickness ranging from 0.5 mm or more to 2 mm or less placed near a focus of the camera and connected to the channel, and an LED light source arranged in a circle around the optical axis of the optical system of the camera, wherein the LED light source emits light intermittently in synchronism with a video signal of the camera.

BRIEF DESCRIPTION OF THE DRAWING

FIG. 4(a) shows linear-like light sources and FIG. 4(b) shows arc-like light sources.

FIG. 6(a) is a top view and FIG. 6(b) is a front cross-sectional view.

FIG. 9(a) is a front cross-sectional view of the important portions and FIG. 9(b) is a perspective view of a sample chamber and a rectifier bath.

DESCRIPTION OF THE PREFERRED EMBODIMENTS

Next, the present invention will now be described in detail below with reference to the accompanying drawings.

Figure 1:
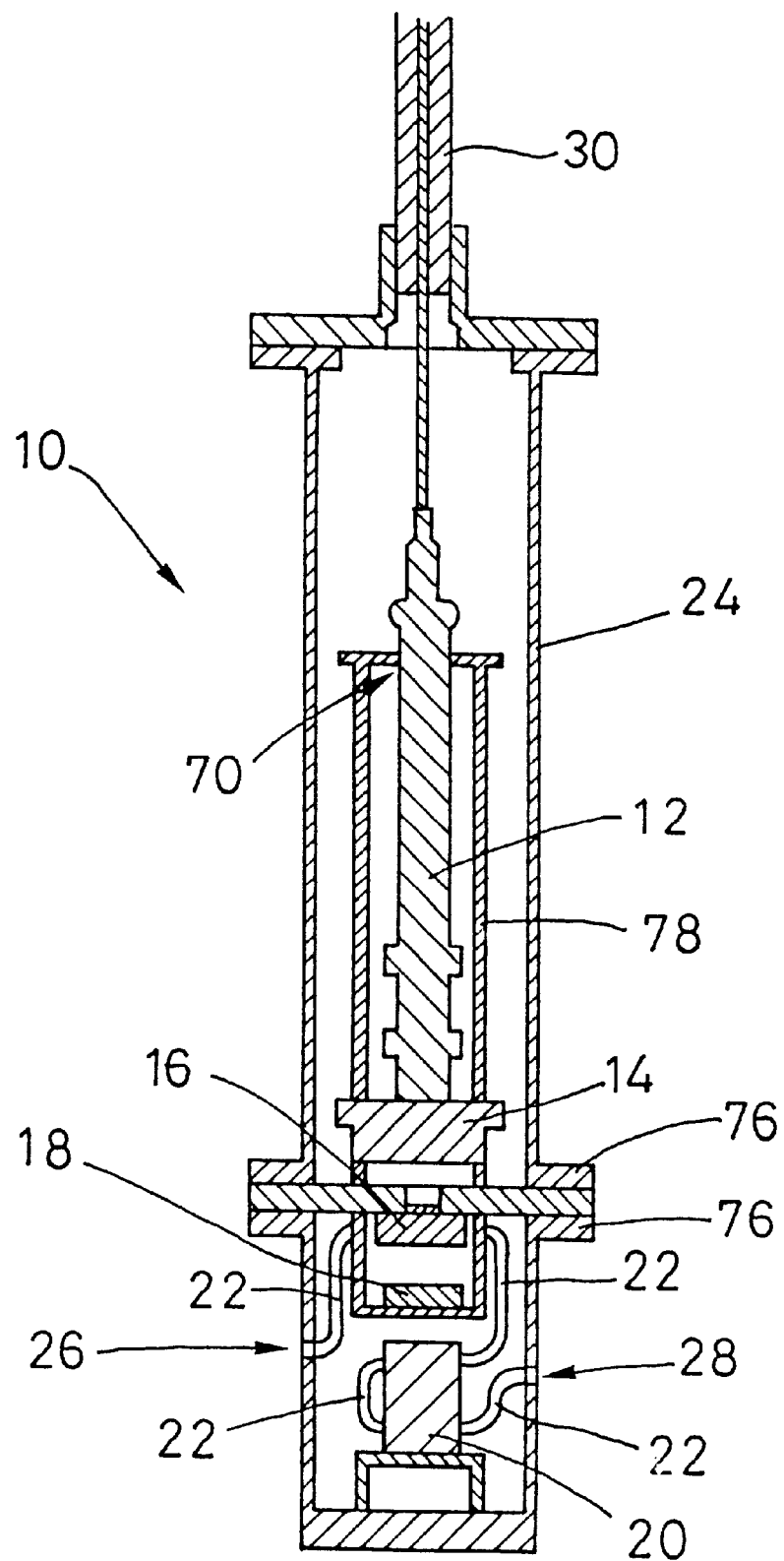
FIG. 1 is a schematic front cross-sectional view of an example of an underwater microscope of the present invention.

FIG. 1 is a schematic view showing an example of the configuration of an underwater microscope 10. In the drawing, a lower end of a camera 12 is grasped by an XY mobile device 14, and a sample chamber 16 is mounted near the focus position of the camera 12. A light source 18 arranged in a circle is placed at the lower part of the sample chamber 16. And a pump 20 for introducing a water sample into the sample chamber 16 is equipped on a further lower part. The pump 20 is connected to the sample chamber 16 through a tube-like channel 22. Further, these components are surrounded by a waterproof case 24, whose structure is not supposed to allow lake water or sea water, or the like to intrude. A water sample is sucked from a suction inlet 26 placed on a side of the waterproof case 24 and is drained from a discharging outlet 28 through the sample chamber 16 and the pump 20.

Figure 2:
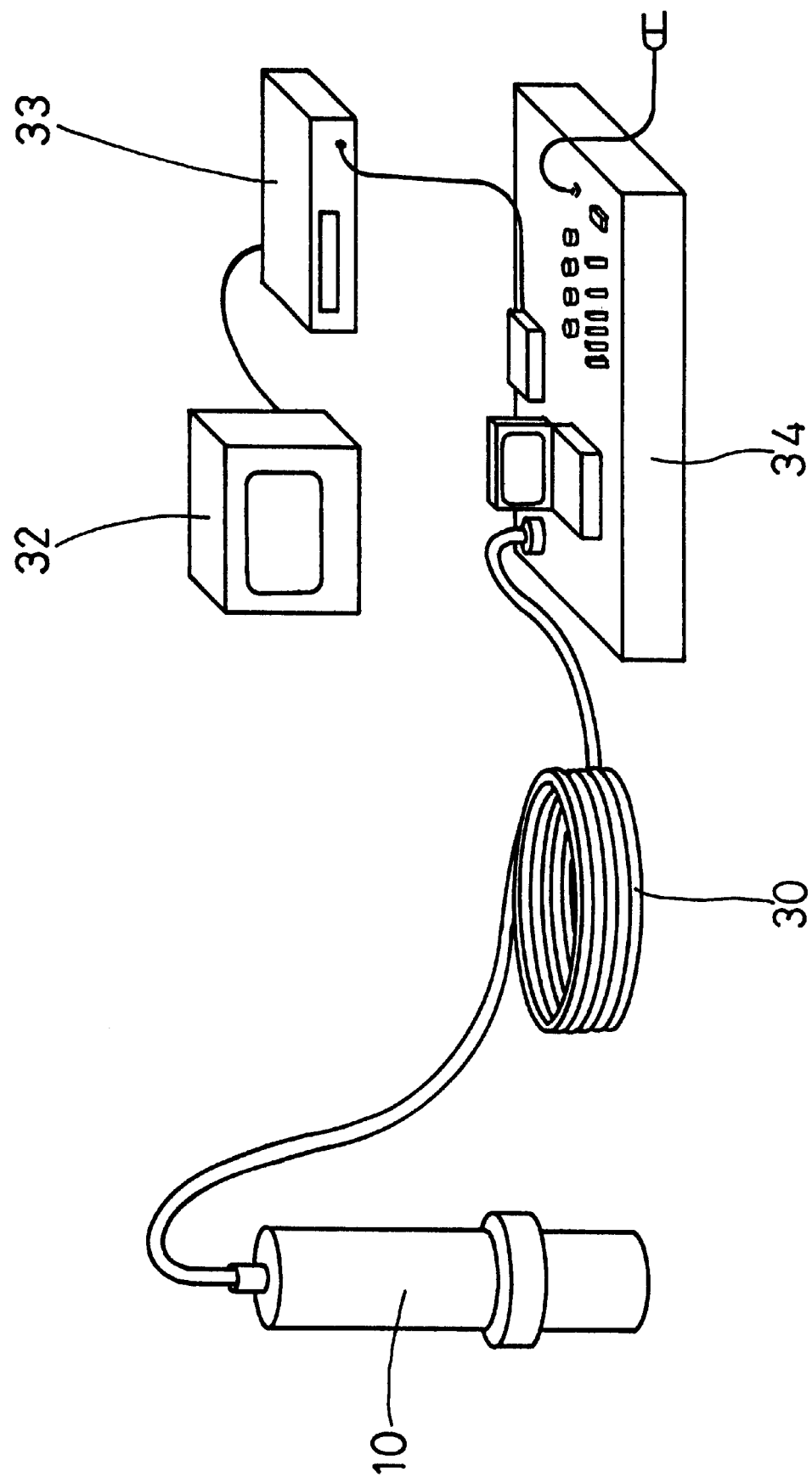
FIG. 2 is an explanation drawing illustrating an example of a system for observing underwater microorganisms with an underwater microscope.

FIG. 2 illustrates a system for using an underwater microscope 10 of the present invention. Information obtained from a camera 12 within the underwater microscope 10, which has been sunk into water, is transmitted to a control box 34 through a waterproof cable 30 on board and is outputted to an external monitor 32 and an external VTR 33. The underwater microscope 10 is regulated by the control box 34 through the waterproof cable 30 in its magnification, and its focus, and the operation of an XY mobile device 14, or the like.

The camera in the present invention means a camera which comprises an optical system such as a camera tube and a lens, etc. The channel for introducing a water sample in the present invention means a channel necessary for leading the water sample into the sample chamber by sucking the water sample and draining water from the sample chamber to the outside of the microscope. The sample chamber in the present invention means a walled partitioned space to stay underwater microorganisms near a focus of the camera.

In the present invention, the sample chamber 16 is relatively wide and has a thickness (depth) of 0.5 mm or more so that underwater microorganisms can move freely as if they were in a natural environment. However, the maximum thickness is 2 mm to prevent the depth of focus of the camera from falling out when it is too thick (deep).

Figure 3:
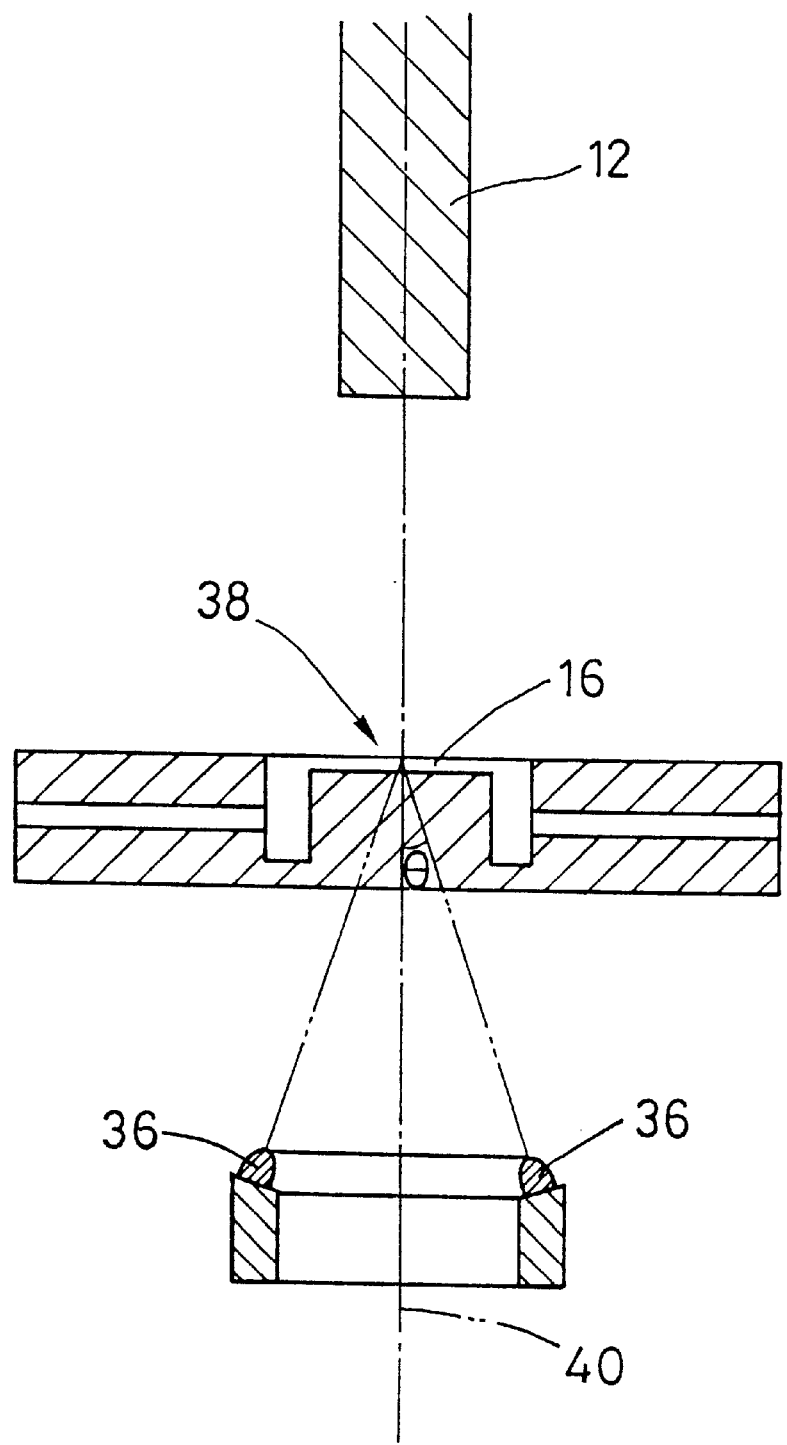
FIG. 3 is a front cross-sectional view of important portions schematically illustrating an alignment among a camera, a sample chamber, and light sources of the present invention.

An illumination method used for the underwater microscope of the present invention will be described in detail below. FIG. 3 is a schematic view showing an alignment among a camera 12, a sample chamber 16, and light sources 36. In this drawing, the sample chamber 16 is located near a focus 38 of the camera 12, and the light sources 36 are located diagonally behind the sample chamber 16 when seeing from the camera 12. Lines linking the light sources 36 to the focus 38 of the camera 12 each form an angle θ with an optical axis 40 of the optical system of the camera 12.

As a result of a detailed experiment on an alignment among the camera 12, sample chamber 16, and light sources 36, the inventors of the present invention have found out that a sharp picture cannot be obtained until when the light sources 36 placed diagonally behind the sample chamber 16 are used for dark field illumination. More specifically, it has revealed in FIG. 3 that transmitted illumination in the case θ is 0 provides low contrast images and reflected illumination in the case θ is 90 degrees at the minimum provides only dark and low contrast images due to weak reflection from underwater microorganisms. These experiment results are considered to be based on that the sample chamber 16 has been thickened in addition to high transparency of underwater microorganisms.

Light sources 36 to be used in the present invention are not specially limited, but the use of fluorescent lamps and light-emitting diodes (LED) or the like are preferable. Light-emitting diodes are especially preferable. Since the light emitting diodes are small sized and their luminance is large, they can be used as the small sized light sources 36 in a desired shape by a combination of some of them.

Figure 4:
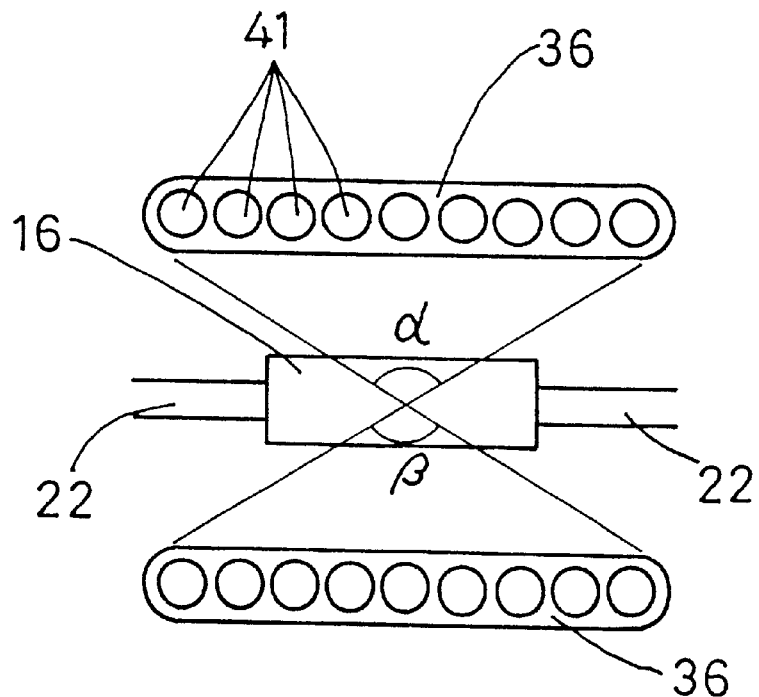
FIGS. 4(a) and 4(b) are schematic top views of shape examples of light sourcesent invention.
Figure 4:
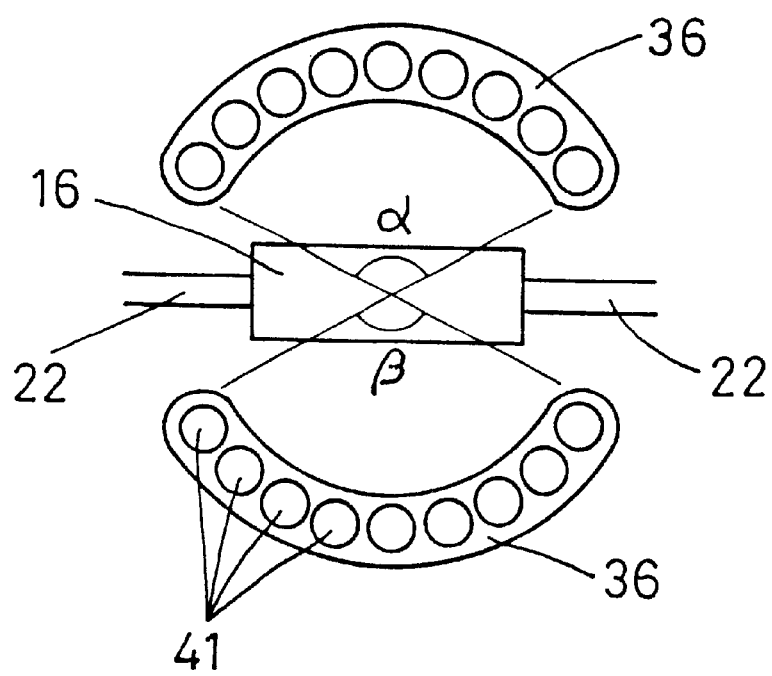
Figure 5:
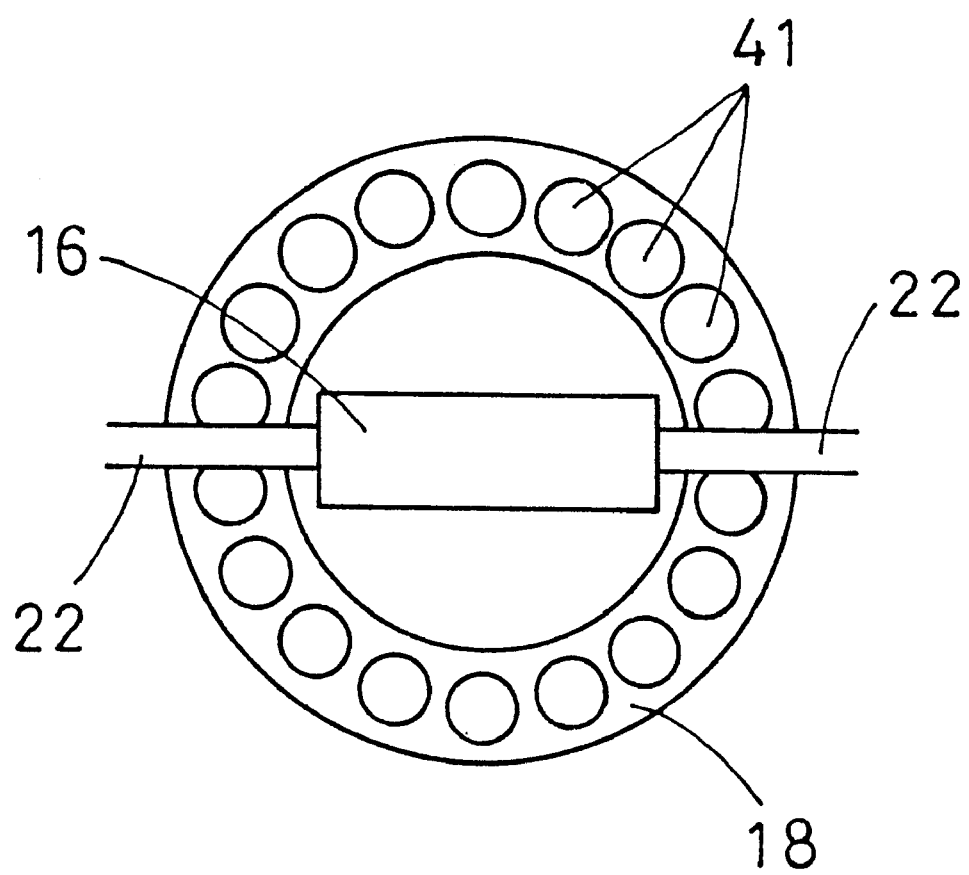
FIG. 5 is a schematic top view illustrating an example of a light source arranged in a circle of the present invention.

To clearly capture the whole shape of underwater microorganisms, illumination from multiple directions is preferable instead of illumination from a single direction. Preferably, the light sources 36 are placed diagonally behind the sample chamber 16, arranged 180 degrees or more around the optical axis 40 of the optical system of the camera 12. More preferably, light sources arranged in a circle are used. FIG. 4(*a*) shows an example of placing 2 linear-like light sources 36 on both sides in the rear of the sample chamber 16. FIG. 4(*b*) shows an example of placing 2 arc-like light sources 36. In both examples, the angles around the optical axes are calculated as a $\alpha+\beta$ in the drawings, and either of these angles are considered to be 180 degrees or more. FIG. 5 shows one embodiment of using a light source 18 arranged in a circle.

Figure 6:
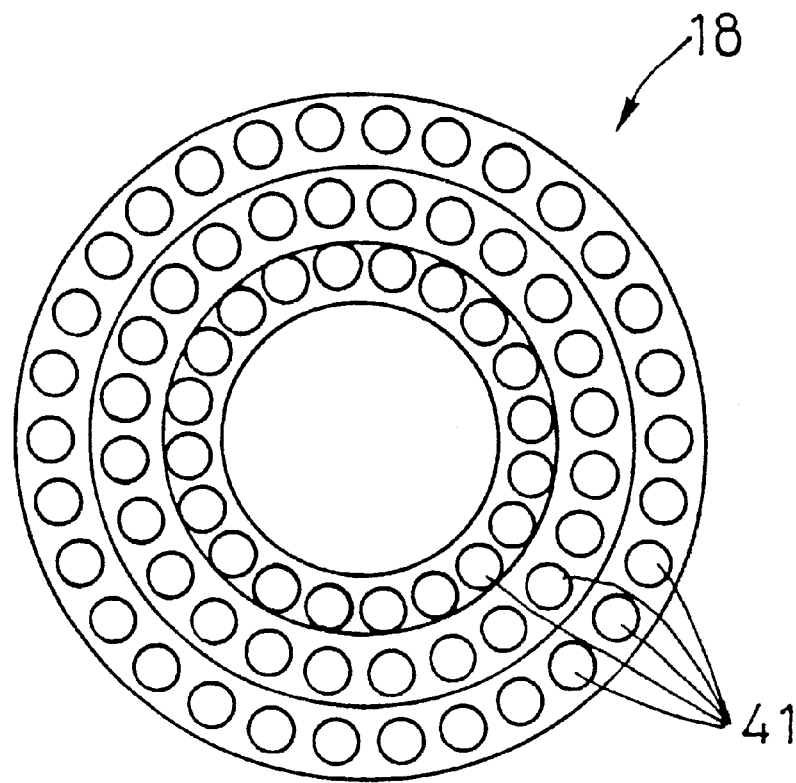
FIGS. 6(a) and 6(b) are schematic views illustrating examples for LED light sources of the present invention.
Figure 6:
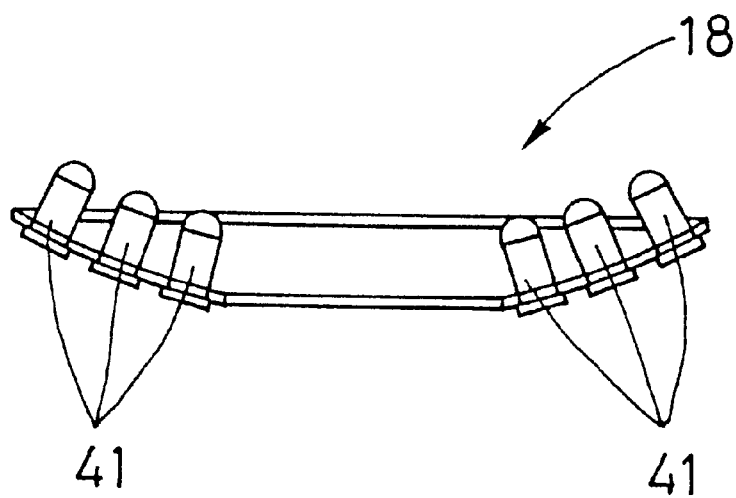

In dark field illumination using the light source 18, the inner diameter of its circle should not be too small so as to prevent excess transmitted light from emitting, but the light source 18 may be constructed in multi-rows. FIGS. 6(*a*) and 6(*b*) respectively show one embodiment of the light source 18 arranged in a circle constructed by light-emitting diodes arranged in three rows. Light emitting diodes of each row are aligned in their each angle so that the focus of the camera 12 may be the maximum lighting intensity.

Figure 7:
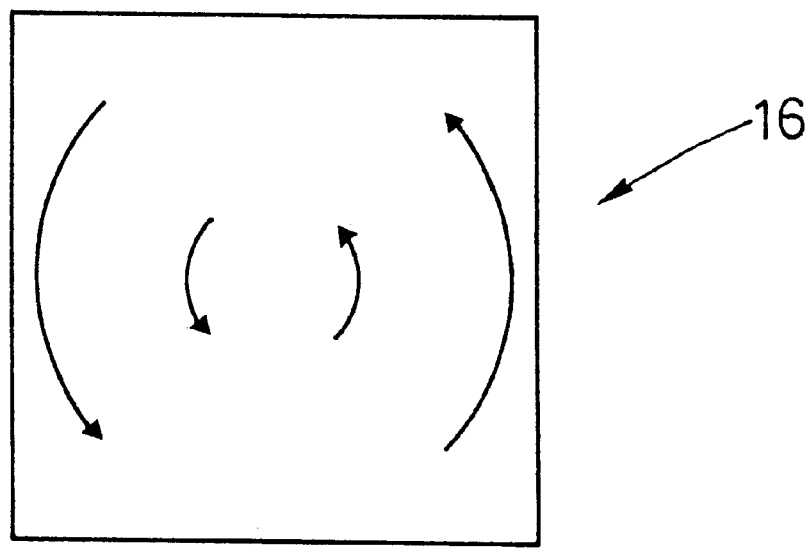
FIG. 7 is a schematic top view illustrating conditions that swirls have occurred within a sample chamber of a conventional example.

Next, the shape of the sample chamber 16 which can be preferably equipped with the underwater microscope of the present invention will now be described in detail. A water sample within the sample chamber 16 moves under the influence of parallel migration and rotations of the underwater microscope 10 in water caused by a stream of water and waves, which leads to unstable picture quality. According to the inventors' observation, it has become apparent that the occurrence of the water sample's scroll flow in sensitive reaction to a rotation as illustrated in FIG. 7 becomes one of causes of poor sharpness of the picture, although the water sample within the sample chamber 16 has little moved even if the underwater microscope 10 is migrated in parallel. The water sample, which is stationary without following the rotation of the microscope 10, is observed to be relatively counter-rotated, seeing from the microscope.

Figure 8:
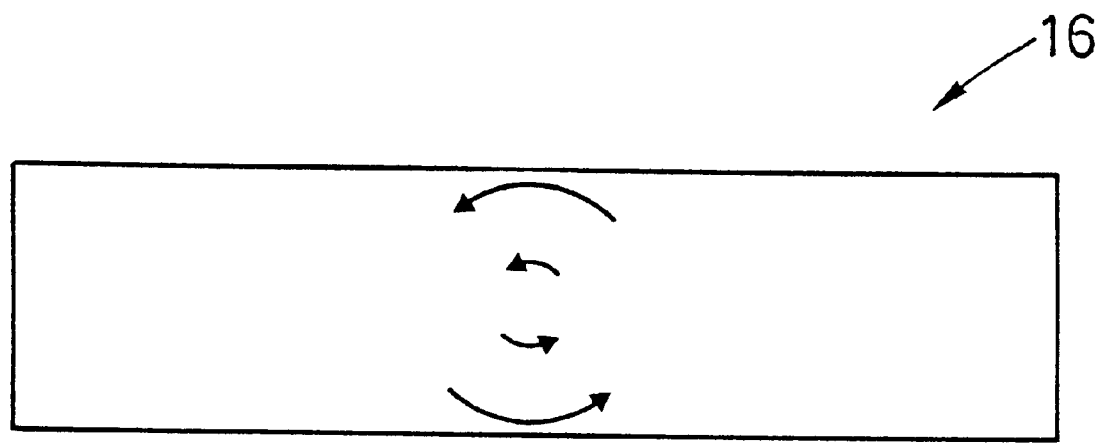
FIG. 8 is a schematic top view illustrating conditions that swirls have occurred within a sample chamber of the present invention.

The inventors of the present invention carried out various studies on the shape of the sample chamber 16 to prevent the water sample from moving in reaction to rotations of the underwater microscope 10. As a result, it has been found out that the movement of the water sample is checked when the thickness of the sample chamber 16 is thinner, but this cannot be adopted because underwater microorganisms become unable to move freely. Further continued studies have revealed that prominent effects are confirmed by using a sample chamber 16 whose picture surface (horizontal cross-section) is in a rectangular shape. Specifically, in the sample chamber 16 whose picture surface is in a rectangular shape, only few scroll flows have occurred and the jitter of the image has sharply decreased as shown in FIG. 8. As a rectangle, the shape wherein the ratio of the short side to the long side is in the range of 1:2 to 1:8.

To make continuous observations effectively, the total amount of the water sample within the sample chamber 16 should be quickly interchanged. However, the water sample staying in the vicinity of the sample chamber 16 cannot be easily interchanged because a new water sample coming into the relatively wide sample chamber 16 through a relatively narrow channel 22 preferentially passes through in the middle of the sample chamber 16. This trend is more prominent as the sample chamber 16 is getting thicker.

Figure 9:
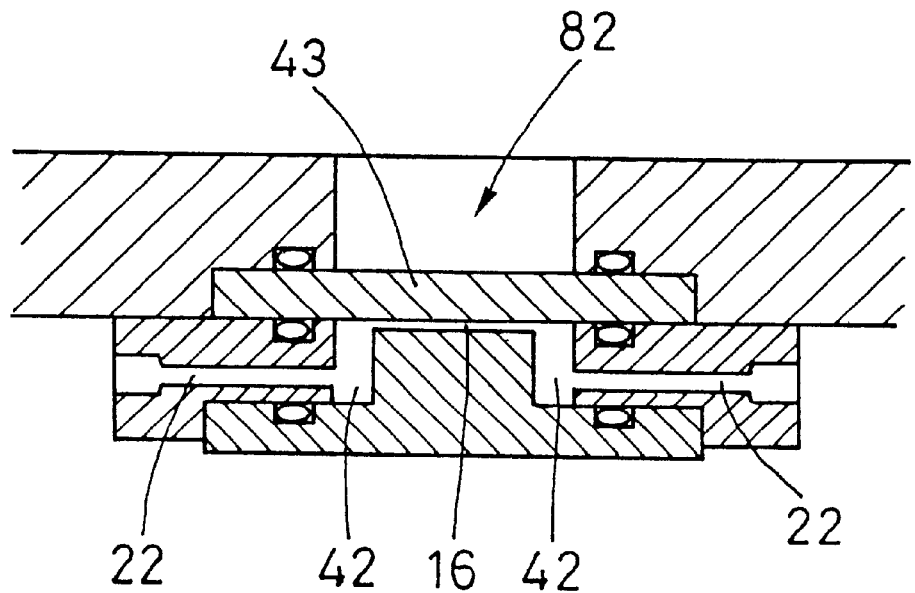
FIGS. 9(a) and 9(b) are schematic views in which important portion are enlarged for illustrating the shape of sample chambers and rectifier baths of the present invention.
Figure 9:
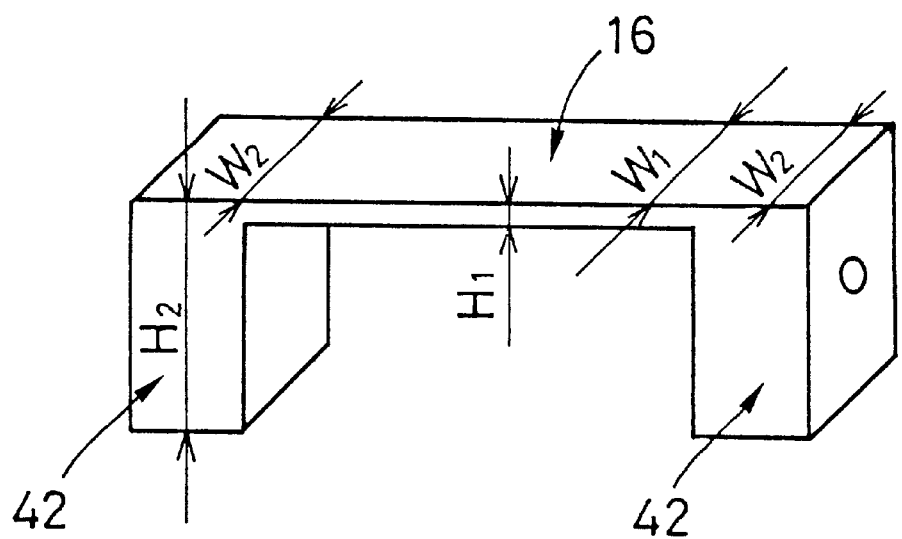

In one embodiment of the present invention, a rectifier bath, which is longer in height than the sample chamber 16 or as wide as or wider than the sample chamber 16, is mounted on both ends of the sample chamber 16; an inlet side and an outlet side. FIGS. 9(*a*) and 9(*b*) respectively show one of its examples. The stream of the water sample gets weaker when coming into the rectifier bath 42, and then it gets rectified in full width of the sample chamber 16. Consequently, the stream of water pushes an old water sample in the vicinity of the sample chamber 16 so that the water sample can be quickly interchanged. Preferably, H2, which is the thickness of the rectifier bath 42, is more than several times as thick as H1, which is the thickness of the sample chamber 16. The width W2 of the rectifier bath 42 is wider than the width W1 of the sample chamber 16. The sample chamber 16 is observed through a window 82 via a transparent plate 43.

Next, a pump 20 for feeding a water sample to the sample chamber 16 which can be preferably used for the underwater microscope of the present invention will now be described in detail. In the underwater microscope 10 of the present invention, the sample chamber 16 is thickened to 0.5 mm at the minimum so that underwater microorganisms can be active, however, it is extremely difficult to continuously observe underwater microorganisms chasing after their movement because some of underwater microorganisms in motion go out of the field of view of the microscope.

The inventors of the present invention have found out that the use of a pump which is capable of forward feeding, back feeding, and stopping feeding a water sample to the sample chamber 16 can solve this problem. More specifically, researchers observe underwater microorganisms when the pump is stationary in ordinary cases, but when the movement of the underwater microorganisms to be a subject for observation is so brisk that they go out of the field of view, it has become possible to return the underwater microorganisms to be a subject for observations to be within the field of view again by making the pump in forward feeding or back feeding.

Figure 10:
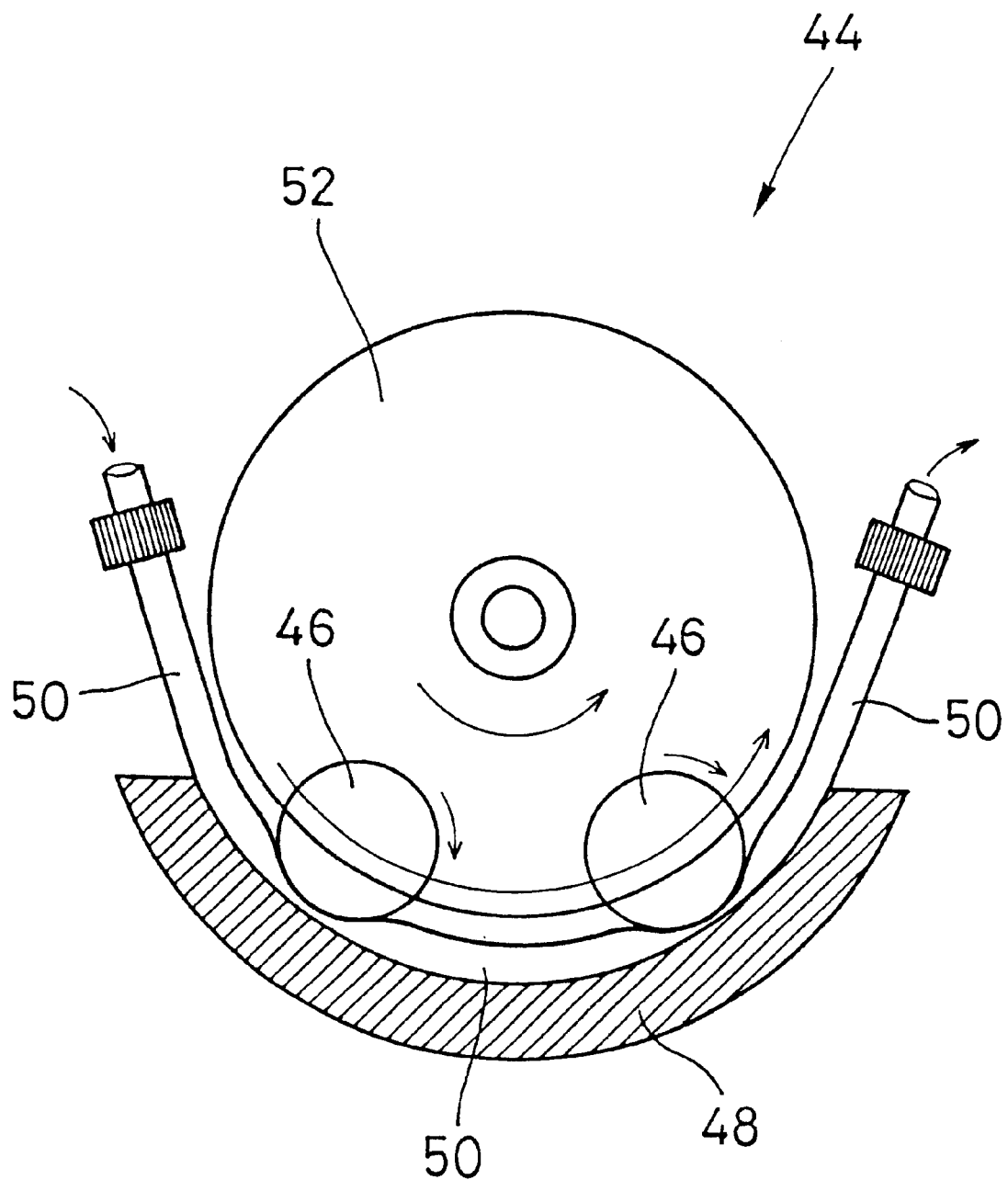
FIG. 10 is a schematic view illustrating the principles of a tube-type pump.

The kind of the pumps capable of forward feeding, back feeding, and stopping feeding are not limited, but tube-type pumps which are the generic name of so-called roller pumps and metal finger pumps, or the like are preferable. As shown in FIG. 10, the principles of a roller pump 44 are that a liquid and gas exist inside a tube 50 are squeezed out by sandwiching a tube 50 between rollers 46 and a tube bearer 48, and advancing the rollers 46 with a rotation of a rotary table 52. A tube-type pump is suitable to be used for the present invention because of an easy switch from a normal rotation to a reverse rotation of the liquid transmission direction, liquid feeding of a trace amount of flow, easy control of the amount of flow, and excellence in fixed amount, or the like.

Figure 11:
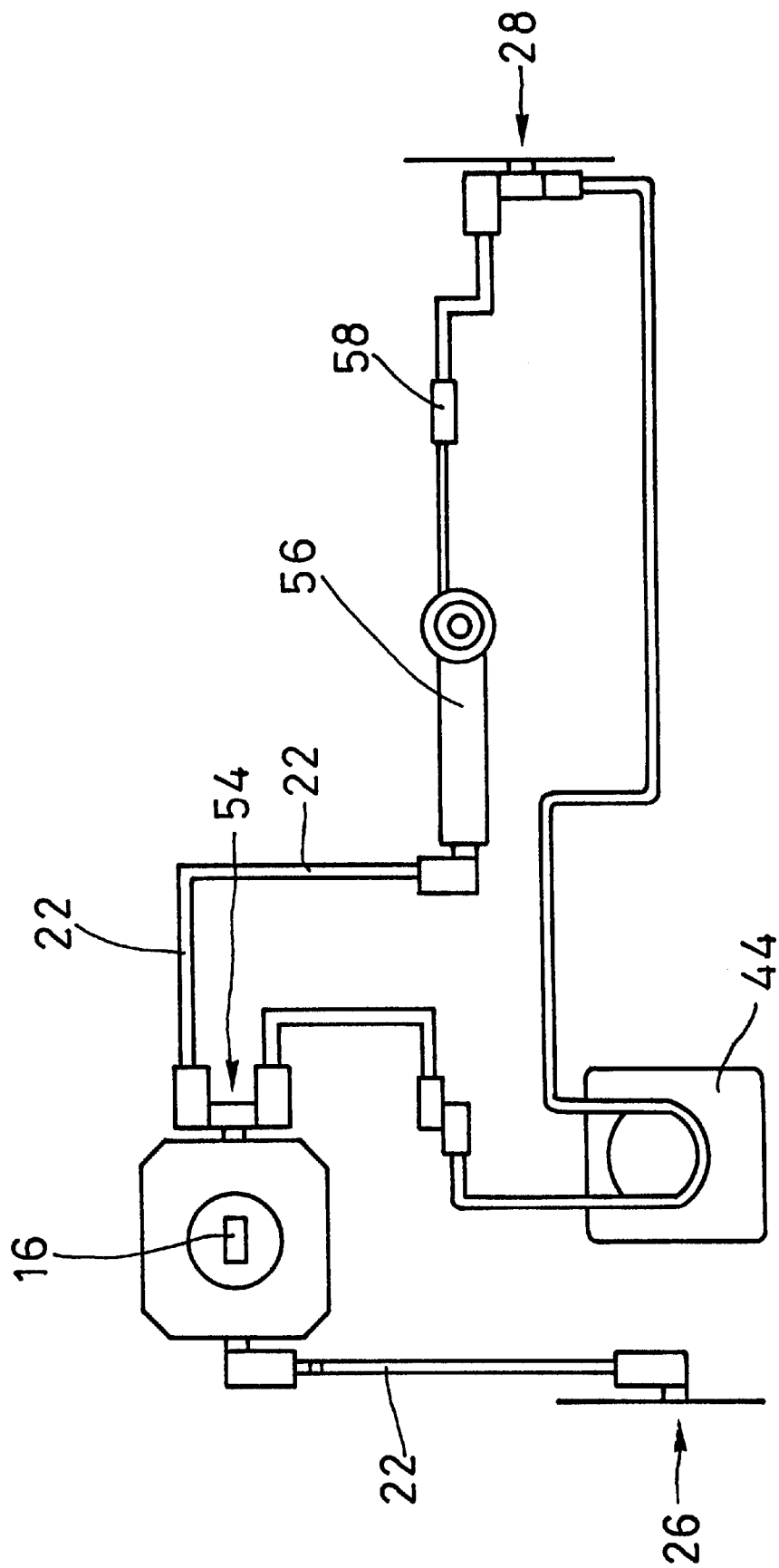
FIG. 11 is an explanation drawing illustrating another configuration example of an underwater microscope according to the present invention.

FIG. 11 shows an example of a method for using a further improved pump. A channel 22 on an outlet side 54 of the sample chamber 16 is branched, and the roller pump 44 and a pump 56 which has a larger amount of flow than the roller pump 44 are placed in parallel. As mentioned above, since the tube-type pump can feed a trace amount of flow and excels in fixed amount, this pump is suitable for quantitatively or continuously examining underwater microorganisms. On the other hand, there are the following problems caused by a small amount of flow. More specifically, large-size zooplankton in brisk motion such as water flea, etc. cannot be sucked due to the small amount of flow. And the small amount of flow hinders stains or bubbles attached to the inside of the sample chamber 16 from being removed. The use of a tube-type pump with a large flow rate can solve these problems, however, the pump cannot be employed because the serviceability of the underwater microscope gets degraded as the pump becomes fairly large-sized, and it becomes difficult to draw up a trace amount of the water sample, which leads to lower accuracy of the flow rate, or the like.

In FIG. 11, ordinarily, only a roller pump 44 is used and a pump 56 with a large amount of flow remains stationary. Since a check-valve 58 is equipped on the downstream of the pump 56, no nature of fixed amount is lost because only the amount of suction by the roller pump 44 flows into the sample chamber 16 without any leakage of the water sample. Operating the pump 56 can solve the above mentioned problems when largesized zooplankton in brisk motion, are sucked or stains and bubbles attached to the inside of the sample chamber 16 are removed. An ordinary rotary pump which is fairly smaller than a tube-type pump may be used as the pump 56 with a large amount of flow.

An XY mobile device which is preferably usable for the underwater microscope of the present invention will now be described in detail. Since live underwater microorganisms and the like are observed as they are in motion with the underwater microscope of the present invention, the microorganisms have to always be brought near a focus of a camera. An XY mobile device equipped with an ordinary microscope, where a sample is placed, is adjusted by manual operation. In the underwater microscope of the present invention, it is, however, extremely difficult to move its sample chamber because a channel for introducing a water sample is placed. Accordingly, it is preferable to move the camera side using the XY mobile device with the sample chamber fixed.

Figure 12:
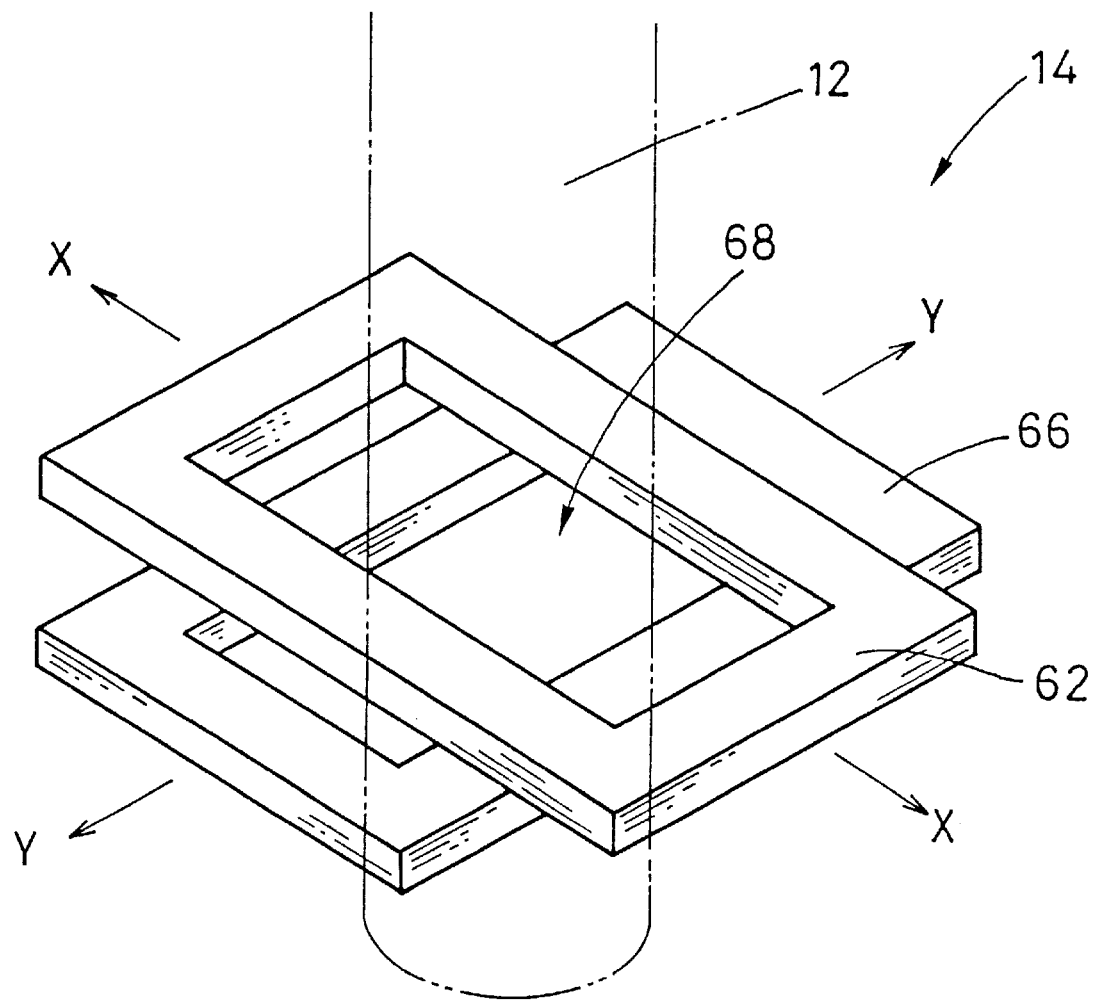
FIG. 12 is a perspective view illustrating an example of a system for an XY mobile device of the present invention.

For example, an XY mobile device 14 is used to move the camera side as shown in FIG. 12. For the XY mobile device 14 of this example, a plate 62 sliding toward the X direction with a rectangular opening and a plate 66 sliding toward the Y direction with a rectangular opening are overlapped at right angles. A part of the camera 12 is inserted into an opening 68, which is almost a perfect square newly formed with an opening and other opening. A part of the camera 12 is movable to an arbitrary point on an XY flat surface by adjusting the sliding length of the plates 62 and 66.

Assuming that a parallel migration is conducted with the total weight of the fairly heavy camera 12 supported, the XY mobile device 14 becomes, however, less practical due to an increase of the size and the weight of the underwater microscope. The inventors of the present invention conducted various types of experiments and have found out a method for moving a focus of the camera 12 by an oscillating style, focusing attention that the camera 12 is in a relatively long shape.

Figure 13:
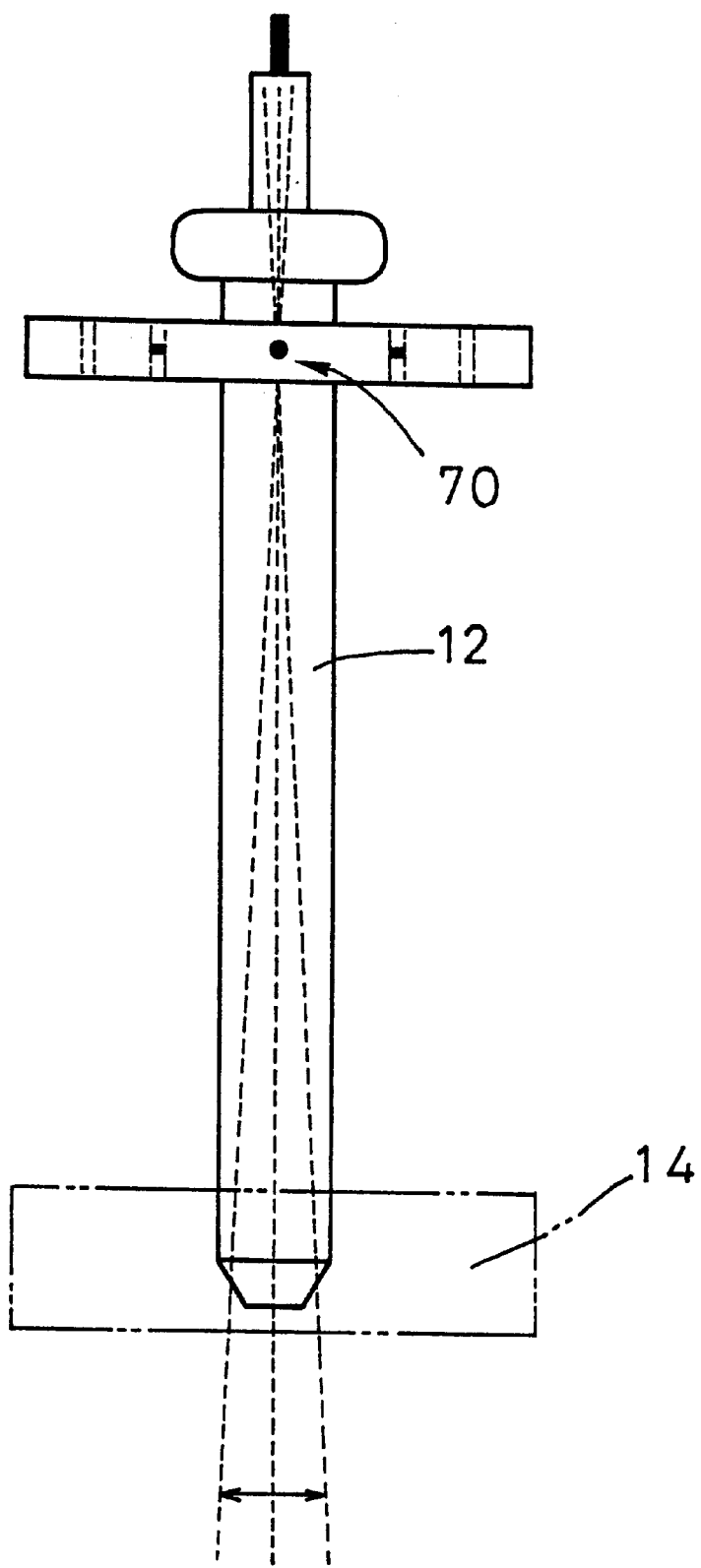
FIG. 13 is a schematic front view illustrating one example of a method for moving the focus position of the camera according to the present invention.
Figure 14:
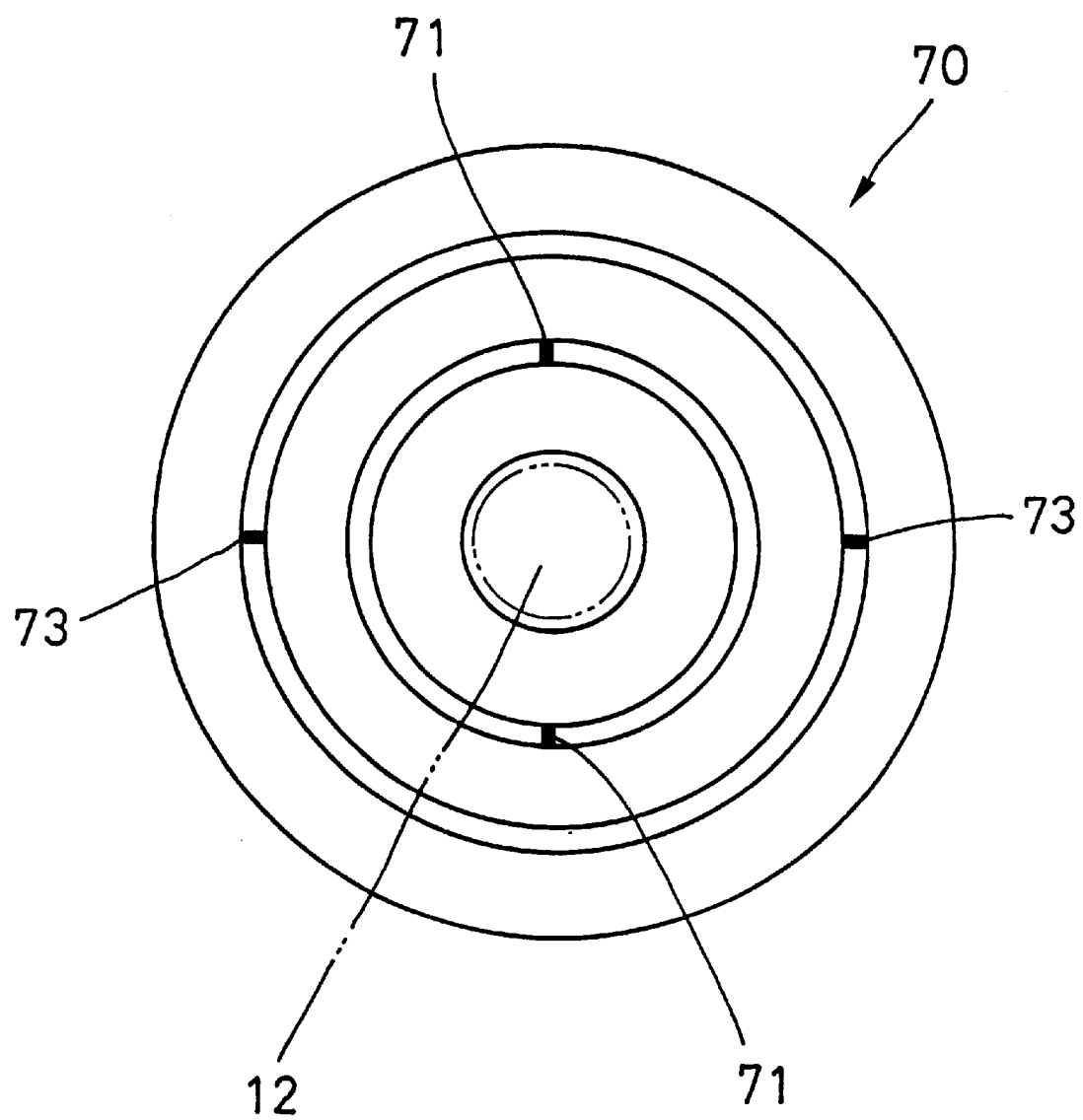
FIG. 14 is a schematic top view illustrating a structure example of a supporting point to move the focus position of the camera according to the present invention.

Specifically, as schematically illustrated in FIG. 13, this is a method for moving a focus in an oscillating type with the XY mobile device 14 mounted at the lower end of the camera 12 by disposing a supporting point 70 touching to the upper part of the camera 12 which can easily vary angles, and hanging the camera 12 with its weight supported. The present invention is based on an experimental finding that short migration length of the tip compared to the relatively long camera 12 leads to little change in the depth of the focus. Using this method, the lower end of the camera 12 is movable with a small force so that the XY mobile device 14 can be downsized. In addition, the migration speed gets enough fast to follow up brisk motions of underwater microorganisms. For example, regarding the supporting point 70, its structure shown in FIG. 14 can be employed, the supporting point is placed on the top surface of a stand 78 to be fixed within a waterproof case 24. In the structure of the supporting point of the present invention, an oscillation is free toward the X direction using rotation axes 71 and an oscillation is free toward the Y direction using rotation axes 73. Consequently, a combination of both rotation axes leads to oscillations toward any directions, which allows a movement of the lower end using the XY mobile device 14.

An electrically driven XY mobile device 14 will be able to adjust on board a focus position of an underwater microscope in water, which would be very convenient. For example, 2 pieces of plates 62 and 66 are respectively driven by motors, and the 2 motors can be controlled by a servo circuit with a joystick equipped with a controller on board.

The underwater microscope 10 in the present invention can be used not only in water but also on land. More specifically, as well as in water, researchers can observe live underwater microorganisms in brisk motion by sucking a water sample prepared in a bucket or a water tank into the sample chamber 16 through the channel 22. The waterproof case 24 may not be mounted on the microscope.

Figure 15:
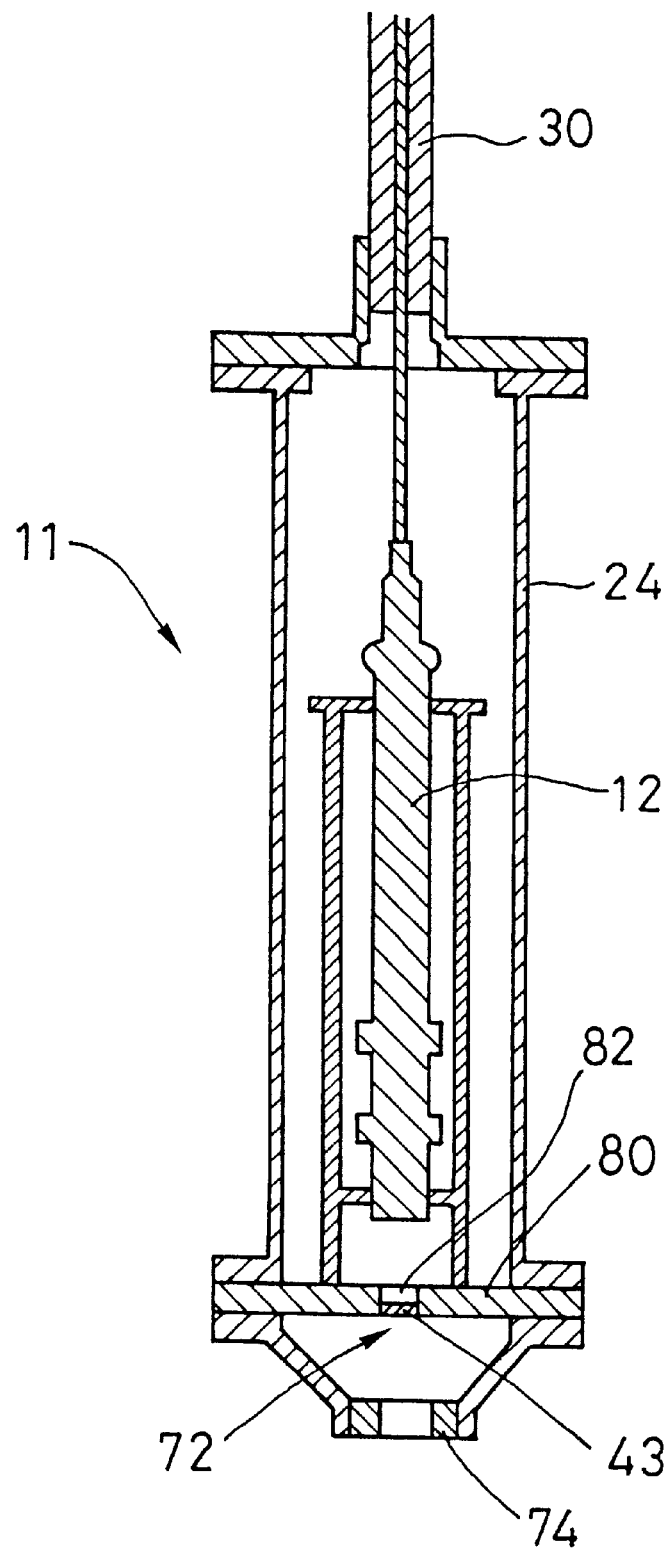
FIG. 15 is a front cross-sectional view schematically showing still another example of an underwater microscope according to the present invention.

In addition, when underwater microorganisms are observed while towing a submerged microscope by a boat, the underwater microscope according to the present invention is capable of obtaining a sharp picture of the underwater microorganisms under harsh conditions that the underwater microscope terribly shakes due to the movement of the boat or the underwater microorganisms rapidly float. More specifically, it is another object of the present invention to provide an underwater microscope which comprises at least a camera having an optical axis of an optical system, a channel for introducing a water sample, a sample chamber having a thickness ranging from 0.5 mm more to 2 mm or less, placed near a focus of the camera and connected to the channel, and an LED light source, arranged in a circle around the optical axis of the optical system of the camera, wherein the LED light source emits light intermittently in synchronism with a video signal of the camera. FIG. 15 shows an example of the structure of an underwater microscope 11 according to the present invention. Compared to the underwater microscope 10 shown in FIG. 1, the underwater microscope 11 is characterized in that no sample chamber 16, channel 22, and pump 20 and the like are equipped. A vicinity of a focus 72 of the camera 12 is free space where sea water or lake water flows almost as fast as a towed boat does.

In the underwater microscope 11 of the example, an LED light source 74 arranged in a circle, which is placed diagonally behind the focus, provides dark field so that even transparent underwater microorganisms can be captured in a picture with high contrast images. Since the luminescence of the LED light source 74 arranged in a circle is intermittent and in synchronism with a video signal of the camera 12, a sharp picture with less camera movement can be obtained by removing a large shake and a rapid movement of the underwater microorganisms.

Any and all changes, modifications, variations and other uses and application of the materials or configuration such as the underwater microscope, camera, XY mobile device, sample chamber, channel, pump, and light sources which do not depart from the spirit and scope of the invention are deemed to be covered by the invention.

The underwater microscope according to the present invention has a sample chamber having a thickness ranging from 0.5 mm or more to 2 mm or less, wherein live underwater microorganisms such as plankton, or the like can freely move.

In the underwater microscope according to the present invention, since the dark field illumination is provided by an LED light source placed diagonally behind the sample chamber, researchers can observe even highly transparent underwater microorganisms in a sharp picture with high contrast.

If light sources are arranged 180 degrees or more around the optical axis of the optical system of the camera, especially if the light sources are arranged in a circle, even highly transparent underwater microorganisms will receive light from multi-directions diagonally backward so that they can be observed in a sharp picture with higher contrast.

Further, when the light sources are so placed that lines linking to the light sources and the focus of the camera each form an angle ranging from 10 to 30 degrees with the optical axis of the optical system of the camera, a refraction from the underwater microorganisms is enhanced so that researchers can observe the underwater microorganisms in a sharp picture with higher contrast.

In another embodiment of the underwater microscope according to the present invention, the horizontal cross-section of the sample chamber 16 is in a rectangular shape, wherein the generation of swirls caused by the shake of the underwater microscope is suppressed, so that a picture with less camera movement can be obtained.

When a rectifier bath, which is longer in height than the sample chamber and at least as wide as or wider than the sample chamber, is mounted at least on an inlet side of a water sample, the water sample coming into the sample chamber is rectified over the full width, which leads to a speedy interchange of the water sample within the sample chamber and consecutive observations due to shortened latency.

In still another embodiment of the underwater microscope according to the present invention, a pump equipped with the microscope, which is capable of forward feeding, back feeding, and stopping feeding to transmit the water sample into the sample chamber, allows rotations in forward or reverse that the underwater microorganisms can return to be within the field of view again, which is very convenient.

With the use of a tube-type pump, quantitative observations become materialized and the operatability is improved because forward feeding, back feeding, and stopping feeding can be easily performed, which allows a very small amount of flow to accurately flow.

Further, the parallel use of a pump capable of forward feeding, back feeding, and stopping feeding and a rotary pump whose flow amount is larger than the above pump allows operation only when necessary so that large-size zooplankton having brisk motions can be sucked, which results in the removal of stains and bubbles attached to the inside of the sample chamber.

In a further embodiment of the underwater microscope according to the present invention, since the XY mobile device is mounted to move the focus position of the camera, live underwater microorganisms in motion can easily be focused without moving the sample chamber connected to the channel, which is difficult to move.

Taking a method for moving the focus position of the camera in an oscillating way with the XY mobile device mounted at the lower end of the camera by placing a supporting point easily varying angles, and hanging the camera with its weight supported, the lower end of the camera can move with a small force. This will follow up brisk motions of underwater microorganisms by accelerating the migration speed along with down-sizing of the XY mobile device.

If the XY mobile device is electrically driven, the movement of the focus of the underwater microscope in water can be easily controlled from the boat, which is convenient.

In a still further embodiment of the underwater microscope according to the present invention, an LED light source, arranged in a circle around the optical axis of the camera is placed at the backward near a focus of the camera to provide dark-field illumination. The LED light source emits light intermittently in synchronism with a video signal of the camera so that even highly transparent underwater microorganisms can be captured in a picture with high contrast, which leads to the removal of a large shake of the underwater microscope and brisk motions of the underwater microorganisms. Consequently a sharp picture with less camera movement can be obtained.

EXAMPLES

The present invention will be more clearly understood by referring the Examples below:

Example 1

An underwater microscope 10 similar to the one shown in FIG. 1 was made. A camera 12 is constructed with a combination of a CCD color camera having an entire length of 56 mm (IK-M42 manufactured by Toshiba Corporation) and an optical system having an entire length of 290 mm (Zoom 70, manufactured by Optem International Corporation). A device similar to the one shown in FIG. 12 was made as an XY mobile device 14 using a stainless steel. A sample chamber 16 and a rectifier bath 42 were integrally made using a transparent acrylic plate similar to the one shown in FIG. 9(a). The sample chamber 16 had a thickness (depth) of 1.2 mm, a length of flow direction of 20 mm, and a width of 5 mm. And the rectifier bath 42 had a thickness (depth) of 8.8 mm, a length of flow direction of 5 mm, and a width of 5 mm. A light source 18 arranged in a circle comprised light-emitting diodes 41, whose model was No. TLRH180P manufactured by Toshiba Corporation, placed in 3 rows as shown in FIGS. 6(a) and 6(b), wherein 20 light-emitting diodes were placed in the inner row, 24 light-emitting diodes were placed in the middle row, and 30 light-emitting diodes were placed in the outer row. Lines linking to the light-emitting diodes 41 and the sample chamber 16 crossed an optical axis 40 of the camera 12 at the angle of 19 degrees. A model No. RP-M50 manufactured by Frue Science Co., Ltd. was used as a pump 20. The regulation of input voltage allowed a flow of water at 19 ml/minute at the maximum. All of these components were contained in a waterproof case 24. The waterproof case 24 was divided into 2; the top and the bottom, and it was connected to flanges 76. Its entire length was 86 cm and its maximum outer diameter was 22 cm. The camera 12 was hung with a support of a supporting point 70 placed on the upper surface of a stand 78 similar to the one shown in FIG. 14, which was constructed by the XY mobile device 14 so that its lower end is movable freely. The maximum migration length with the XY mobile device 14 was considered to be 10 mm. The distance between the lower end of the camera 12 and the center of the sample chamber 16 was 80 mm. The distance between the center of the sample chamber 16 and the center of the light source 18 arranged in a circle was 40 mm.

The underwater microscope 10 of this example was combined with a control box 34, an external monitor 32, and an external VTR 33 as shown in FIG. 2 to establish an underwater microorganism observation system. Using this underwater microorganism observation system, researchers can directly observe live underwater microorganisms in a sharp picture as they are, and can record it on the video tape so that this system earns an excellent reputation as an avenue for a scientific research or an educational material at school, or the like.

Example 2

An underwater microscope 11 similar to the one shown in FIG. 15 was made. A camera 12 and an LED light source 74 arranged in a circle, which were used in Example 2, were the same as those used in Example 1. Underwater microorganisms floating near a focus 72 was observed through a window 82 placed on a waterproofing bottom plate 80 having a transparent plate 43. Video signals of an LED light source 74 arranged in a circle and the camera 12 were synchronized through a video synchronizing pulse circuit, for example, a sharp picture without camera movement was obtained at the luminous space of 1/30 seconds and at the luminous time from 5 to 20 micro seconds.

There has thus been shown and described a novel underwater microscope which fulfills all the objects and advantages sought therefore. Many changes, modifications, variations and other uses and applications of the subject invention will, however, become apparent to those skilled in the art after considering this specification and the accompanying drawings which disclose the preferred embodiments thereof. All changes, modifications, variations and other uses and applications which do not depart from the spirit or scope of the present invention are deemed to be covered by the invention, which is to be limited only by the claims which follow.

What is claimed is:

1. An underwater microscope comprising, at least:
   a camera having an optical axis of an optical system;
   a channel for introducing a water sample;
   a sample chamber having a thickness ranging from 0.5 mm or more to 2 mm or less, placed near a focus of said camera and connected to said channel; and
   light sources, placed diagonally behind said sample chamber, wherein said light sources provide dark field illumination to the microscope.

2. The underwater microscope according to claim 1, wherein said light sources are arranged 180 degrees or more around the optical axis of the optical system of said camera.

3. The underwater microscope according to claim 2, wherein said light sources are arranged in a circle around the optical axis of the optical system of said camera.

4. The underwater microscope according to claim 1, wherein said light sources are so arranged that lines linking to said light sources and the focus of said camera each form an angle ranging from 10 to 30 degrees with the optical axis of the optical system of said camera.

5. An underwater microscope comprising, at least:
   a camera having an optical axis of an optical system;
   a channel for introducing a water sample;
   a sample chamber having a thickness ranging from 0.5 mm or more to 2 mm or less, placed near a focus of said camera and connected to said channel; and
   light sources, placed diagonally behind said sample chamber,
   wherein said sample chamber has an inlet and an outlet, and a picture surface of said sample chamber is in a rectangular shape.

6. The underwater microscope according to claim 5, wherein said sample chamber has a rectifier bath, which is longer in height than said sample chamber and as wide as or wider than said sample chamber, is mounted on an inlet side of a water sample.

7. An underwater microscope comprising, at least:
   a camera having an optical axis of an optical system;
   a channel for introducing a water sample;
   a sample chamber having a thickness ranging from 0.5 mm or more to 2 mm or less, placed near a focus of said camera and connected to said channel; and
   light sources, placed diagonally behind said sample chamber,
   wherein a pump connected to said channel, capable of forward feeding, back feeding, and stopping feeding a water sample into said sample chamber, is equipped and said sample chamber has an inlet and an outlet.

8. The underwater microscope according to claim 7, wherein said pump is a tube-type pump.

9. The underwater microscope according to claim 7, wherein said pump, capable of forward feeding, back feeding, and stopping feeding a sample water, and a pump having a larger amount of flow than said pump are connected in parallel to a channel of an outlet of said sample chamber.

10. An underwater microscope comprising, at least:
    a camera having an optical axis of an optical system;
    a channel for introducing a water sample;
    a sample chamber having a thickness ranging from 0.5 mm or more to 2 mm or less, placed near a focus of said camera and connected to said channel; and
    an XY mobile device for moving a focus position of said camera.

11. The underwater microscope according to claim 10, wherein said camera is hung by a supporting point with an easily variable angle placed on an upper part of the camera and said XY mobile device is connected to a tip of a lower part of the camera.

12. The underwater microscope according to claim 10, wherein said XY mobile device is electrically driven.

13. An underwater microscope comprising, at least:
    a camera having an optical axis of an optical system;
    a channel for introducing a water sample;
    a sample chamber having a thickness ranging from 0.5 mm or more to 2 mm or less, placed near a focus of said camera and connected to said channel; and
    an LED light source, arranged in a circle around the optical axis of the optical system of the camera, wherein said light source emits light intermittently in synchronism with a video signal of said camera.

* * * * *